(12) United States Patent
Nichols

(10) Patent No.: US 6,950,790 B1
(45) Date of Patent: Sep. 27, 2005

(54) METHOD OF PROCESSING SEISMIC DATA

(75) Inventor: David Edward Nichols, Cambridge (GB)

(73) Assignee: Westerngeco, L.L.C., Houston, TX (US)

( * ) Notice: Subject to any disclaimer, the term of this patent is extended or adjusted under 35 U.S.C. 154(b) by 0 days.

(21) Appl. No.: 09/463,765

(22) PCT Filed: Aug. 12, 1998

(86) PCT No.: PCT/GB98/02428

§ 371 (c)(1),
(2), (4) Date: Jan. 31, 2000

(87) PCT Pub. No.: WO99/09434

PCT Pub. Date: Feb. 25, 1999

(30) Foreign Application Priority Data

Aug. 15, 1997 (GB) ...................................... 977409

(51) Int. Cl.$^7$ .............................................. G06G 7/48
(52) U.S. Cl. .................... 703/10; 703/2; 703/7; 702/14
(58) Field of Search .......... 703/1–2, 7–10; 702/14–18; 367/73

(56) References Cited

U.S. PATENT DOCUMENTS 5,062,086 A * 10/1991 Harlan et al. .................. 367/38
6,081,482 A * 6/2000 Bevc ............................. 367/57

FOREIGN PATENT DOCUMENTS

GB         1-463 060 A  *  2/1977  ............ G01V 1/28

OTHER PUBLICATIONS

Neri et al, "Tomographic Reconstruction from Incomplete Data Set with Deterministic and Stochastic Constraints", Proceedings of the SPIE, vol. 2033, pp. 22-34 (Jul. 1993).*
Fischer et al, "Shortest Path Ray Tracing with Sparse Graphs", Geophysics, vol. 58 No. 7, pp. 987-986 (Jul. 1993).*
Moser, "Migration Using the Shortest-Path Method", Geophysics, vol. 59 No. 7, pp. 1110-1120 (Jul. 1994).*
Keller et al, "Fast Seismic Ray Tracing", SIAM Journal of Applied Mathematics, vol. 43 No. 4, pp. 981-992 (Aug. 1983).*
Symes, "A Slowness Matching Finite Difference Method for Traveltimes Beyond Transmission Caustics", http://citeseer.nj.nec.com/symes96slowness.html, pp. 1-21 (1996).*
Geoltrain et al, "Can We Image Complex Structures with First-Arrival Traveltime?", Gephysics, vol. 58 No. 4, pp. 564-575 (Apr. 1993).*

(Continued)

Primary Examiner—Samuel Broda
(74) Attorney, Agent, or Firm—Westerngeco, L.L.C.

(57) ABSTRACT

A method of processing seismic data using a seismic energy propagation model of the subsurface is disclosed. The method assigns seismic source, seismic receiver, and reflection point locations to the propagation model; identifies a plurality of alternative raypaths consistent with the propagation model that originate at said seismic source location, reflect at said reflection point location, and terminate at said seismic receiver location; selects a raypath from the plurality of alternative raypaths having a shortest ray length, and utilizes the selected raypath in subsequent seismic processing.

10 Claims, 4 Drawing Sheets

OTHER PUBLICATIONS

Vinje et al, "Traveletime and Amplitude Estimation Using Wavefron Construction," Geophysics, vol. 58, pp. 1157-1166 (1993).*

Albertin et al, "A Comparison of Kirchhoff Migration Results for the SEG/EAGE Salt Model Using Several Traveltime Generators," 66th Annual International Meeting, Society of Exploration Geophysics, pp. 562-565 (1996).*

Frank et al, "Methods for Improving the Stability of Electromagnetic Geophysical Inversions," IEEE Transactions on Geoscience and Remote Sensing, vol. 27 No. 3, pp. 339-343 (May 1989).*

Radcliff et al, "Electromagnetic Geophysical Imaging Incorporating Refraction and Reflection," IEEE Transactions on Antennas and Propagation, vol. AP-29 No. 2, pp. 288-292 (Mar. 1981).*

* cited by examiner

METHOD OF PROCESSING SEISMIC DATA

BACKGROUND OF THE INVENTION

1. Field of the Invention

The present invention relates to a method of processing seismic data.

2. Description of Related Art

Seismic data is collected in order to analyse the sub-surface of the earth, in particular for hydrocarbon exploration. Seismic data for analysing sub-surface structures may be collected on land or, over water, using sea-going vessels. In order to obtain the data, a seismic source which may comprise explosives (on land) or an impulse of compressed air or airguns (at sea) is provided. The seismic data signals reflected by the various layers beneath the surface of the earth are known as traces and are sensed by a large number, typically hundreds, of sensors such as geophones on land and hydrophones at sea. The reflected signals are recorded and the results are analysed to derive an indication of the layer formations beneath the sub-surface. Such indications may then be used to assess the likelihood of hydrocarbon deposits.

The analysis of the results to derive an indication of layer formations, however, is not straightforward. Particularly where the materials of the sub-surface of the earth vary laterally, there may be more than one signal path between the seismic source and a point within the sub-surface which reflects the signal. Typically, the same will be true of the return path between the reflecting point and a respective seismic sensor, such as a geophone or a hydrophone. If a case of three different paths in each direction is considered, there will be nine different round-trip routes by which a signal can travel from the seismic source to the seismic sensor from a single reflection point. Cost-effective analysis using all of these possible paths is impossible, so some means of simplifying the processing is required.

In "Green's Functions for 3D Pre-stack Depth Migration" published in the EAGE 57 Conference and Technical Exhibition in Glasgow, Scotland on 29 May to 2 Jun. 1995, the following two prior art techniques for reducing this complexity are discussed. It will be understood that the signals resulting from a single reflection point will generally arrive at the geophone at different times and with different amplitudes dependent upon the distance of the path travelled and the sound-propagating characteristics of the subsurface layers through which the sound waves have passed. Consequently, there are a number of "ray paths" through the sub-surface of the earth which relate to a signal reflected by a single reflection point. One proposed solution to the complexity of the numerous ray paths is to select a so-called first arrival signal. This will be the arrival signal (or "arrival") corresponding with the fastest propagating seismic signal. However, one drawback of this technique is that the first arrival is rarely the strongest signal and often contains too little energy to provide reliable and accurate analysis. However, the methods for calculating the first-arriving travel time tend to be cheaper and simpler than other methods.

Some of these methods are commonly (and confusingly) referred to as "shortest path" methods, although they actually compute a shortest travel-time path, rather than a shortest physical ray length path. Articles describing this type of method may also be found in Geophysics, Volume 56, No. 1, January 1991, T. J. Moser, "Shortest path calculation of seismic rays", pages 59–67; Geophysics, Volume 58, No. 7, July 1993, Robert Fischer et al., "Shortest path ray tracing with sparse graphs", pages 987–996; and Geophysics, Volume 59, No. 7, July 1994, T. J. Moser, "Migration using the shortest-path method", pages 1110–1120. References to the process of computing the shortest travel-time raypath (rather than the shortest ray length raypath), can be found in these articles on page 59, abstract, line 4; page 987, column 2, line 20; and page 1111, column 2, line 37, respectively.

Another prior art technique is to select the arrival having the maximum amplitude. However, selection of this arrival is not necessarily straightforward because the model of the sub-surface will generally only be approximate. The maximum amplitude arrival will only provide the best single arrival as long as the estimates of amplitude are correct. Another difficulty with the maximum amplitude arrival is that the choice of arrival can switch rapidly back and forth between branches. However, improvements using the maximum-amplitude arrival over use of a first arrival have been observed in the prior art reference first identified above.

It is an object of the present invention to provide a method of processing seismic data which ameliorates the disadvantages of these prior art techniques.

SUMMARY OF THE INVENTION

According to the present invention, there is provided a method of processing seismic data using a seismic energy propagation model of the subsurface, including: assigning seismic source, seismic receiver, and reflection point locations to the propagation model; identifying alternative raypaths that originate at the seismic source location, reflect at the reflection point location, and terminate at the seismic receiver location; selecting a raypath having a shortest ray length; and utilizing the selected raypath in subsequent seismic processing.

It has been appreciated that applying the shortest ray-path length criterion will virtually never result in a low amplitude signal. While the physical length of the ray will vary in response to changes in the velocity model, the physical ray length is less susceptible to such changes than is the estimate of the amplitude. The reason for this is that amplitude is related to the curvature of the rays. Thus small errors in the ray paths can produce large errors in the amplitudes. In contrast, the ray-length is an integral quantity (the integral of arc length along the ray) so it is relatively insensitive to small perturbations in the ray path. In other words, the choice of a particular ray using the technique of the present invention is less likely to switch rapidly than the maximum amplitude technique. This provides a much more reliable assumption upon which to base subsequent processing than either of the prior art techniques.

Further preferred features of the present invention are set out in the attached dependent claims.

BRIEF DESCRIPTION OF THE DRAWINGS

The present invention will now be described, by way of example, with reference to the accompanying drawings, in which.

DETAILED DESCRIPTION OF THE INVENTION

Figure 1:
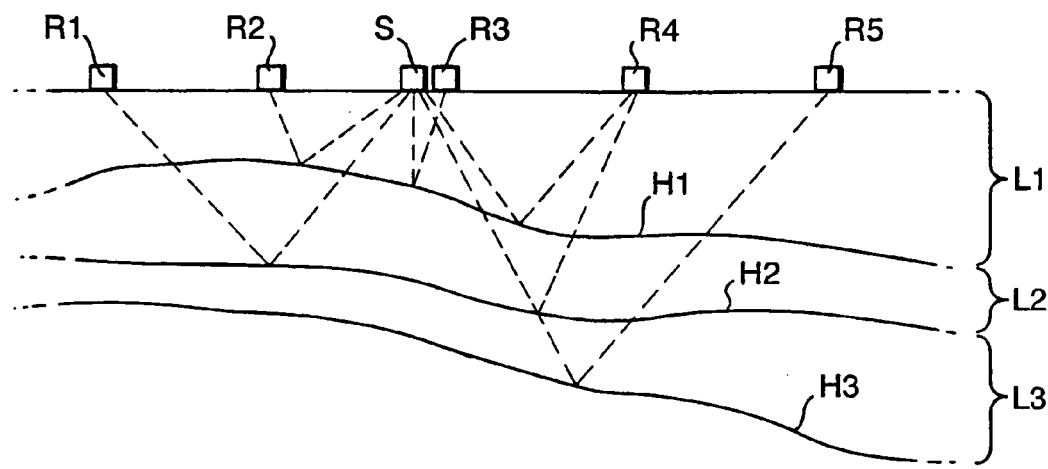
FIG. 1 shows a seismic source and a plurality of seismic receivers arranged above a number of subsurface layers in the earth.

In FIG. 1, a seismic source S, for example an explosive, is located on the surface of the earth together with a plurality of geophones R1 to R5. Typically, there will be hundreds of geophones arranged in a two dimensional or a three dimensional array over the surface of the earth. For simplicity, only five geophones R1 to R5 are shown. Seismic signal paths ("ray paths") are shown in broken lines between the source S and the geophones R1 to R5 via subsurface layers L1, L2, and L3. The ray paths are shown reflecting from a number of horizons H1, H2, and H3. Only some of the ray paths are shown for clarity.

Because the seismic signals will travel at different speeds in the layers (typically the speed of propagation will increase with an increase in depth) it is not straightforward to locate the horizons H1, H2, and H3. The data from each horizon is generally separated and a seismic energy propagation model (i.e. an estimate of the subsurface acoustic velocities) of the subsurface being analysed is applied to derive an estimate of the actual reflecting (or "imaging") point on a horizon beneath the surface. The process of prestack depth migration involves simultaneously adding together multiple samples to increase the signal to noise ratio of the data (similar to a conventional "stacking" procedure), moving seismic events to compensate for the offset distance between the source and the receiver (similar to a conventional "normal move-out correction" procedure), and moving seismic events to compensate for inclined seismic reflectors (similar to a conventional "migration" procedure). Prestack imaging of seismic data is usually implemented using an integral formulation in the time space domain.

While the phrase "reflection point" is used throughout this application, this phrase may be more fully be understood as being an "image point", i.e. a subsurface location illuminated by the raypath in question. Similarly, the raypath from the source to the image point and from the image point to the receiver will have an abrupt change of directions at the image point. While this change of direction is referred to as being a "reflection" throughout this application, it may also be thought of as being "scattered" at the image point. The seismic energy propagation model may not incorporate any assumptions regarding reflector dip (inclination) angles in the vicinity of the image point and the "downgoing" ray from the source to the image point is not necessarily required to have a seismic reflector incidence angle that is equal and opposite to the seismic reflector incidence angle of the "upgoing" ray from the image point to the receiver.

The image at any point is computed from an integral over a surface in the prestack data. The integral can be written in the generic form of:

$$\text{Image}(x_i) = \int \int W Data(x_s, x_r, t_s + t_r) dS dR$$

where $x_i$, $x_s$, and $x_r$ are the image, source and receiver locations, $W(x_i, x_s, x_r)$ is a (possibly complex and frequency dependent) weight that is a function of the source, receiver and image location, and $t_s(x_i, x_s)$ and $t_r(x_i, x_r)$ are the traveltimes from the source and receiver to the image point respectively. The traveltimes and weight functions depend on a model that is an estimate of the subsurface properties. The integral is evaluated over all source and receiver co-ordinates. The traveltimes define a trajectory in the data over which the integral takes place.

The traveltimes may be calculated by many methods (e.g. finite difference methods, gridded travel time approximation methods, ray-tracing). Most of these methods solve a high frequency approximation to the wave equation which decouples the solution into two parts, first solving the eikonal equation for the traveltimes and then solving the transport equation for the amplitudes. The eikonal equation is an equation that results from asymptotic expansion of the wave equation. It is a non-linear differential equation that is satisfied by the traveltimes. All of the methods either explicitly or implicitly calculate the ray-path which is the path that the energy travels along between the source or receiver and the image point.

When the present inventive method is used, it is preferable to use a ray-tracing method. Ray-tracing methods often inherently calculate travel distances as they select alternative ray-paths or provide outputs that allow the travel distances of the various ray-paths to be easily calculated.

Figure 2:
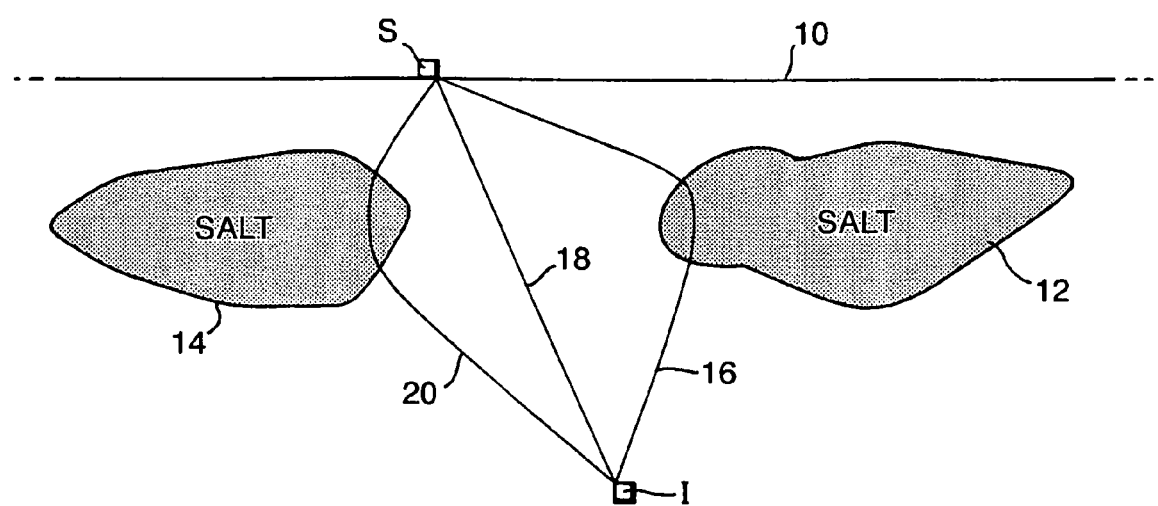
FIG. 2 shows a single source location and a single image location with several ray paths between them.

However, in a complex subsurface model there may be several ray paths that connect the source to the receiver and this means that the traveltime functions will be multivalued. FIG. 2 shows one example of a complex model that gives rise to multivalued traveltimes. A seismic source S is being used to analyse an image I at a point beneath the surface 10 of the earth. However, there are two salt bodies 12, 14 arranged on either side of the direct path 18 between the source S and image I. The salt bodies 12, 14 refract the seismic rays and provide two further paths 16, 20 between the source S and the image I. The two salt bodies thus produce refracted ray paths from the source to the image point in addition to the direct ray path that does not travel through the salt.

When the traveltime is multivalued, the correct way to evaluate the integral is to sum over all branches of the traveltime functions. However, if there are three paths from the source S to the image I and three from the image to the receiver, then there are 9-branches over which to sum. 3-D prestack depth migration is already expensive. A 9-fold increase in computational complexity will severely lengthen the analysis and hence increase the cost greatly. As the number of paths increase, the complexity increases accordingly.

If we do not use the results from all of the branches, we must make a choice of which branch or branches to use. The choice should give an integration trajectory that follows significant energy in the scattered wavefield and one that gives a well behaved approximation to the continuous integral. If the integral is performed as a weighted sum over sampled data, this means that the trajectory should be at least piecewise continuous.

One prior art technique as discussed briefly above is to use the first arrival because it is easier to calculate and it is guaranteed to be a continuous function. However, it has been pointed out that the first arrival may contain very little energy and is thus not always a suitable choice.

Figure 3:
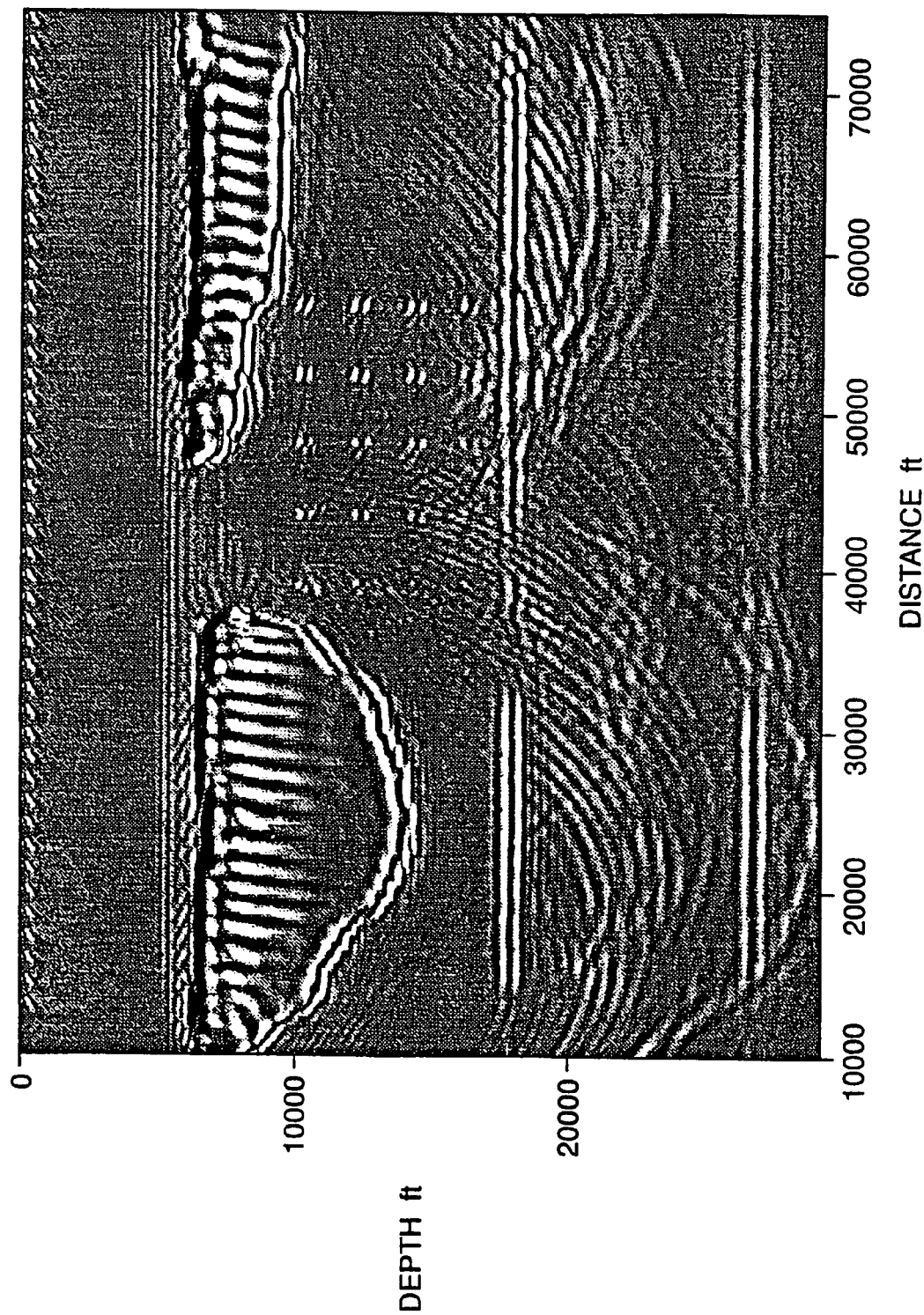
FIG. 3 shows a two dimensional seismic image of distance against depth for a particular seismic model using the seismic signal having the first arrival (i.e. the shortest travel time path)

FIG. 3 shows a post-analysis seismic image in which the horizontal axis shows a distance (in feet) along the surface from the origin of the survey. The vertical axis shows the depth (in feet) beneath the surface of, in this case, a water layer that extends to 6000 feet. The traveltimes used in building this image were created using a finite difference solution to the well known eikonal equation. The pre-stack migration was performed using the first arrival at the seismic receiver. In this figure it can be noticed that many of the features are somewhat hazy. In particular, there are two layers in the image located approximately at 17,000 feet and 27,000 feet respectively. The clarity of these layers is very poor and there are significant parts of the image of these layers where the layer is not evident at all. This is particularly the case in the higher layer (17,000 feet) at distances of approximately 33,000 feet to 50,000 feet from the origin of the survey and in the lower layer (at 27,000 feet) between 30,000 and 47,000 feet approximately from the origin of the survey. There are two large salt bodies, the first located at between 6,000 and 14,000 feet in depth and between 10,000 and 37,000 feet from the origin of the survey. The second salt body is located between approximately 6,000 and 10,000 feet in depth and between approximately 45,000 and 75,000 feet from the origin of the survey. As described above with reference to FIG. 2, the salt bodies can be responsible for refracted ray paths and this can result in low energy levels in the first arrival. The images of the layers in this model are consequently poorly defined. In addition the grid-like features at a distance between approximately 40,000 and 60,000 feet and a depth between approximately 9,000 and 17,000 feet are poorly defined. The analysis based on the first arrival also provides poor resolution of these comparatively small features.

Another prior art technique has been to choose the maximum amplitude arrival. This is the best single arrival to use as long as the estimates of amplitude are correct. The reference cited previously shows improvements in prestack depth imaging when maximum amplitude traveltimes calculated by ray tracing are used.

Figure 4:
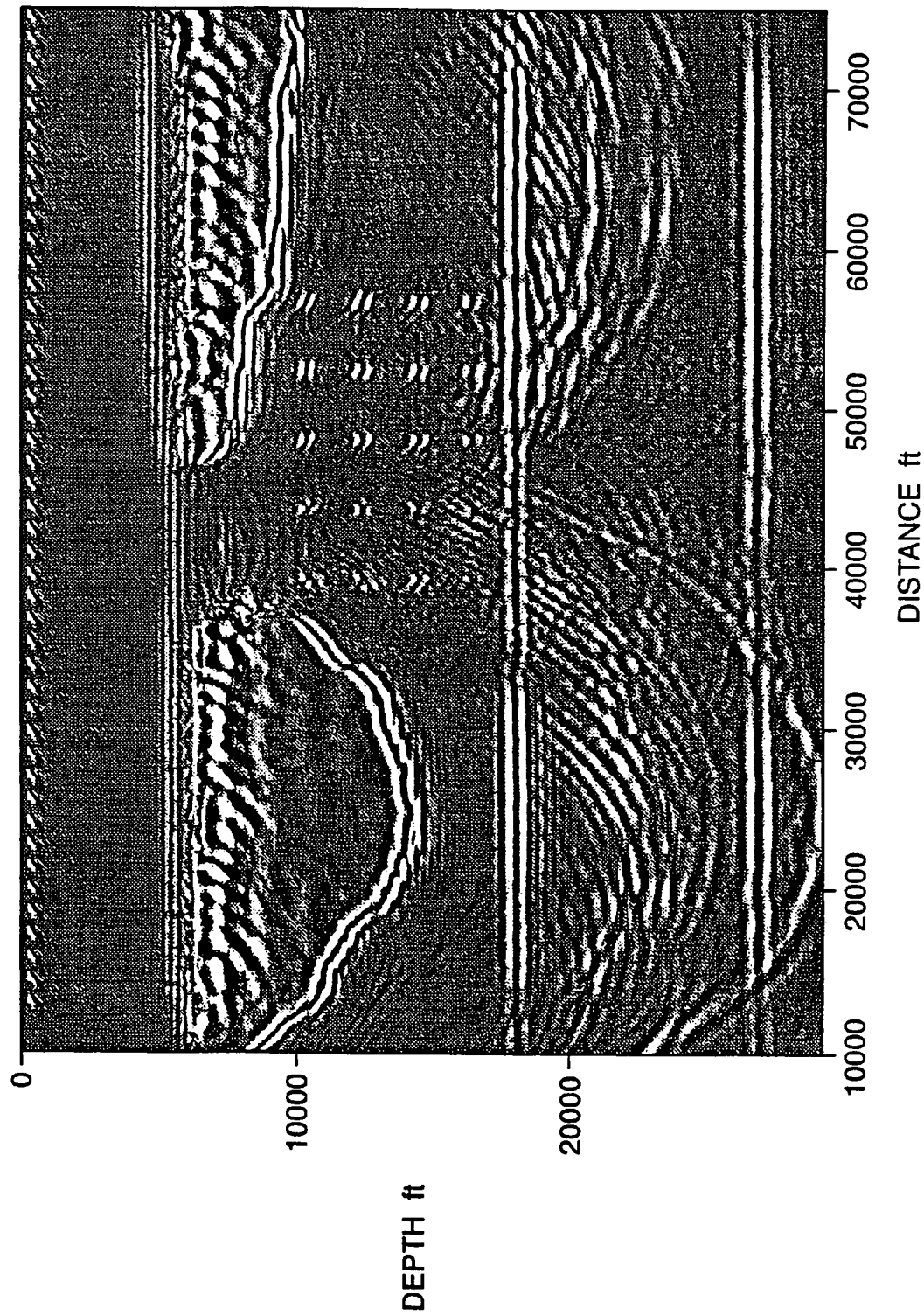
FIG. 4 shows a seismic image of distance against depth for the seismic model using the seismic signal having the maximum amplitude arrival.

FIG. 4 shows a seismic image covering the same distance and depth and derived from the same seismic model as the image shown in FIG. 3. In this case the maximum amplitude arrival was selected for pre-stack migration and subsequent stacking. By comparison with FIG. 3 it can be seen that almost every feature in the image is sharper. The two horizontal layers at approximately 17,000 feet and 27,000 feet respectively have also been reconstructed rather more clearly than in the image based on the first arrival. However, those parts of the two layers identified in the discussion of the previous image are still reconstructed somewhat unclearly. In particular, the lower layer (27,000 feet) is reconstructed somewhat vaguely over the range between approximately 32,000 to 44,000 feet from the origin of the survey. In addition, the small grid of features arranged at a distance between approximately 40,000 and 60,000 feet are substantially clearer.

Unfortunately the amplitudes calculated in the asymptotic approximation are not necessarily a good approximation to amplitudes of the finite frequency wavefield. The high frequency amplitudes are much more sensitive to the fine detail of the velocity model than the finite bandwidth wavefield. This has two results, first the choice of arrival can switch rapidly from one branch to another and secondly the choice of branch is very sensitive to changes in the model. Since we generally only have an approximate model, the choice made can be very different to the choice that would be made in the true model. This clearly compromises the accuracy of the analysis.

To ameliorate these shortcomings, the present invention provides a new criterion for selecting the signal traveltime to be used for imaging. The traveltime that is selected is that associated with the ray that has shortest physical length. This ray is often the highest amplitude arrival but this is not guaranteed. More importantly, it is almost never a low amplitude first arrival associated with refracted energy. In addition, the physical length criterion is much more stable with respect to small fluctuations in the velocity model or to changes in the model because it is an integral quantity as discussed above.

Unlike that for the first arrival, the traveltime from the shortest ray is not a continuous function. It is, however, piecewise continuous. In addition, because it is more stable, it tends to consist of a few large pieces with well defined boundaries between them. In contrast, the result of using maximum amplitudes tends to be a much more "broken up" trajectory consisting of lots of small segments with rapid switching back and forth between branches.

While a continuous function is desirable, the piecewise continuous function provided by the shortest ray has other advantages (e.g. it is associated with more of the energy).

Figure 5:
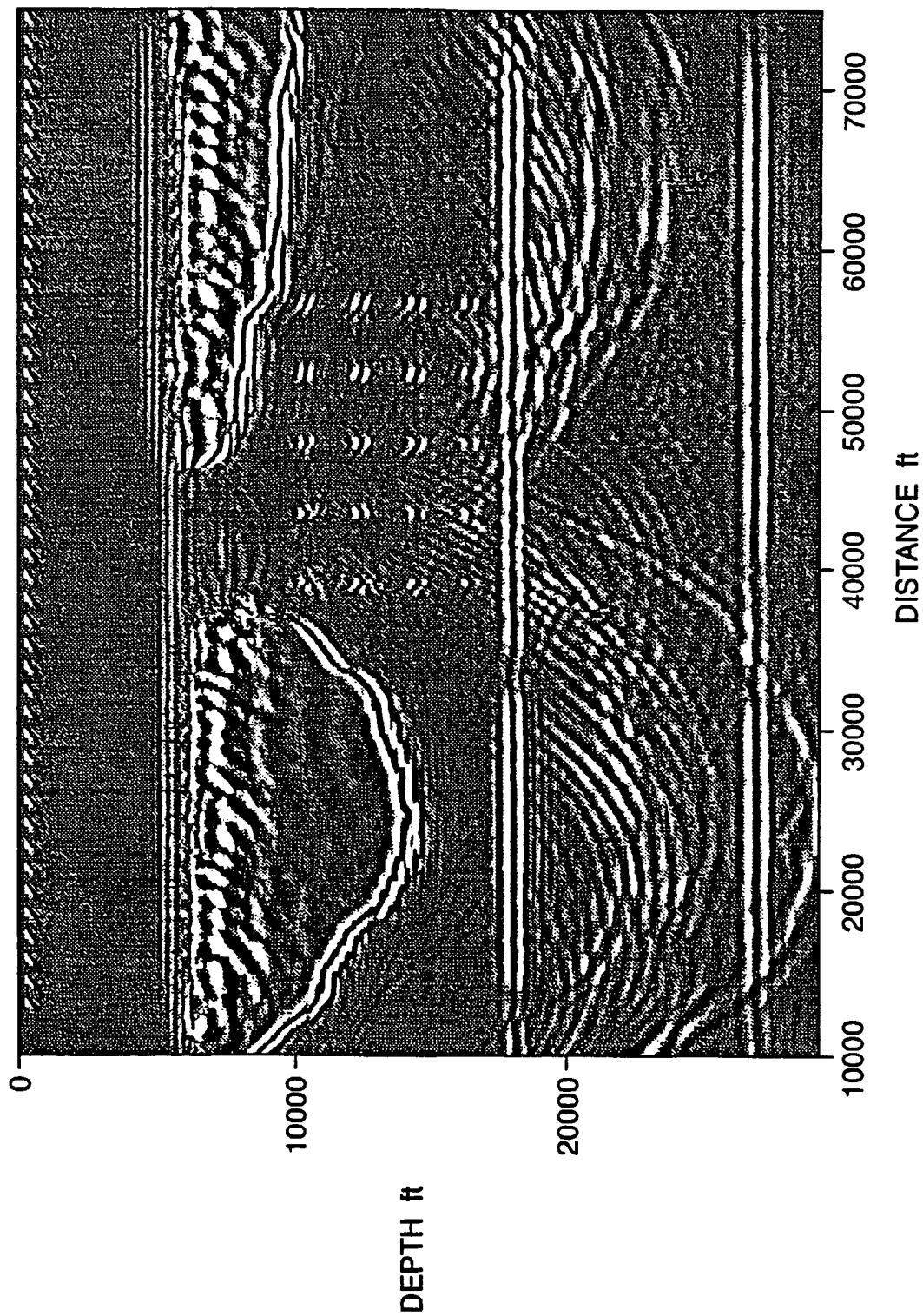
FIG. 5 shows a seismic image of distance against depth for the seismic model using the arrival associated with the raypath having the shortest raypath length.

FIG. 5 shows a further image corresponding to those of FIG. 3 and FIG. 4 and being derived from the same seismic model. In this instance, however, the pre-stack migration has been performed using the shortest ray length rather than the ray corresponding with the first arrival or the maximum amplitude arrival. By comparison with FIG. 3, it can readily be seen that the image provided using shortest-ray prestack migration results in a much clearer image than selection of the first arrival. The improvement of this image over that derived using the maximum amplitude arrival is not quite so marked but an improvement nonetheless exists. In particular, the reconstruction of the layers at approximately 17,000 feet and 27,000 feet respectively is improved. The reconstruction of the upper layer has improved clarity, especially between approximately 32,000 feet and 50,000 feet from the origin of the survey. There is an even clearer improvement over the image shown in FIG. 4 in the case of the lower layer (at 27,000 feet). The portion of this layer between approximately 30,000 and 43,000 feet from the origin of the survey has a distinctly improved clarity. The continuity of both of these layers below the gap between the salt bodies is much improved. The advantages in changing from maximum amplitude arrival to shortest path arrival is not as great as that from the first arrival but it is generally clear that the image everywhere is either just as good or it is improved.

In all of the migrated sections shown in FIGS. 3 through 5, the images of the curved events below 20,000 feet are artefacts due to multi-reflection arrivals and should be ignored.

The selected raypath is used in prestack depth migration for two primary purposes, to establish an acoustic pulse arrival time and to calculate an estimate of the amplitude of the arrival. These values may be used, for instance, to determine which input sample from a seismic trace acquired at the particular receiver location and associated with an acoustic pulse from the particular source location will be used to calculate the output sample associated with the image point, as well as the weight that will be applied to the input sample.

While FIGS. 3, 4, and 5 show two dimensional cross-sections of the subsurface, they have been created using a three dimensional set of seismic data. The prestack depth migration algorithm used to develop these sections is a true three dimensional method that does not assume that the acoustic energy transmitted from the source to the receiver travels in the vertical plane connecting these points or that the image point must reside in this vertical plane. This consideration of "out-of-plane" energy both increases the quality of the seismic image obtained as well as increasing the complexity of properly processing the data.

The selected raypath may also be used to update the seismic energy propagation model of the subsurface (i.e. the velocity model).

While the seismic data used to demonstrate the inventive method has been conventional pressure-pressure (P-P) mode seismic data, the inventive method may be used in an identical manner with pressure-shear (P-S) mode seismic data (as well as shear-shear (S-S) mode and other seismic energy transmission modes) simply by providing a seismic energy propagation model of the subsurface that accounts for these alternative seismic energy transmission modes.

The spirit and scope of the present invention is not restricted to the described embodiments but encompasses any invention disclosed herein, explicitly or implicitly, and any generalization thereof.

What is claimed is:

1. A computer-implemented method of processing seismic data using a seismic energy propagation model of the subsurface, said method comprising the steps of:

assigning seismic source, seismic receiver, and reflection point locations to said propagation model, identifying a plurality of alternative raypaths consistent with said propagation model that originate at said seismic source location, reflect at said reflection point location, and terminate at said seismic receiver location, selecting a raypath from said plurality of alternative raypaths having a shortest ray length, and utilizing said selected raypath in subsequent seismic processing.

2. A computer-implemented method as claimed in claim 1, in which said step of selecting a raypath comprises calculating travel distances for each of said alternative raypaths and comparing said calculated travel distances to determine which of said alternative raypaths has said shortest travel distance.

3. A computer-implemented method as claimed in claim 2, in which said plurality of alternative raypaths are identified by a ray tracing procedure.

4. A computer-implemented method as claimed in claim 3, in which said propagation model is three dimensional and said plurality of alternative raypaths are not coplanar.

5. A computer-implemented method as claimed in claim 4, in which said selected ray path is used to calculate an acoustic pulse arrival time.

6. A computer-implemented method as claimed in claim 5, in which said selected raypath is used to estimate an arrival amplitude.

7. A computer-implemented method as claimed in claim 6, in which said selected raypath is used to select a sample from a seismic trace acquired at said seismic receiver location associated with an acoustic pulse from said seismic source location, said sample being used to create an image of said reflection point.

8. A computer-implemented method as claimed in claim 7, in which said selected raypath is used to calculate a weight to be applied to said sample.

9. A computer-implemented method as claimed in claim 8, in which said propagation model models pressure-pressure (P-P) mode seismic energy transmission in the geologic subsurface.

10. A computer-implemented method as claimed in claim 8, in which said propagation model models pressure-shear (P-S) mode seismic energy transmission in the geologic subsurface.

* * * * *